US012069086B2

(12) United States Patent
Marshall

(10) Patent No.: US 12,069,086 B2
(45) Date of Patent: *Aug. 20, 2024

(54) SYSTEM AND METHOD FOR MALWARE DETECTION USING HASHING TECHNIQUES

(71) Applicant: Capital One Services, LLC, McLean, VA (US)

(72) Inventor: Christopher Marshall, Chesterfield, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/846,312

(22) Filed: Jun. 22, 2022

(65) Prior Publication Data

US 2022/0321580 A1 Oct. 6, 2022

Related U.S. Application Data

(63) Continuation of application No. 15/878,566, filed on Jan. 24, 2018, which is a continuation of application No. 14/681,311, filed on Apr. 8, 2015, now Pat. No. 9,912,690.

(60) Provisional application No. 61/976,722, filed on Apr. 8, 2014.

(51) Int. Cl.
*H04L 9/40* (2022.01)
*G06F 21/50* (2013.01)
*H04L 67/1097* (2022.01)

(52) U.S. Cl.
CPC ............ *H04L 63/145* (2013.01); *G06F 21/50* (2013.01); *H04L 63/123* (2013.01); *H04L 67/1097* (2013.01)

(58) Field of Classification Search
CPC . H04L 63/145; H04L 63/123; H04L 67/1097; G06F 21/50
See application file for complete search history.

(56) References Cited

U.S. PATENT DOCUMENTS

| | | | | |
|---|---|---|---|---|
| 6,654,751 | B1 * | 11/2003 | Schmugar | G06F 21/561 |
| | | | | 707/999.005 |
| 8,230,505 | B1 * | 7/2012 | Ahrens | H04L 63/168 |
| | | | | 705/5 |
| 8,443,449 | B1 * | 5/2013 | Fan | G06F 21/564 |
| | | | | 713/188 |
| 8,528,085 | B1 * | 9/2013 | Juels | G06F 21/6218 |
| | | | | 726/22 |

(Continued)

*Primary Examiner* — Jason Chiang
(74) *Attorney, Agent, or Firm* — TROUTMAN PEPPER HAMILTON SANDERS LLP; Christopher J. Forstner; John A. Morrissett

(57) ABSTRACT

A system and method in accordance with example embodiments may include systems and methods for generating and transforming data presentation. The method may include receiving, using a processor, a request for a web page, and submitting, by the processor, the request to a computer server system. The request can include a user identification and a user password. The method may further include receiving, from the computer server system, data corresponding to the requested web page. Further, the method includes storing, in a memory, the received data, and causing the received data to be shown on a display associated with the user device.

20 Claims, 3 Drawing Sheets

(56) References Cited

U.S. PATENT DOCUMENTS

| | | | |
|---|---|---|---|
| 8,539,567 B1* | 9/2013 | Logue | H04L 63/08 709/227 |
| 8,578,166 B2* | 11/2013 | De Monseignat | H04L 63/0823 713/176 |
| 8,635,373 B1* | 1/2014 | Supramaniam | H04L 63/08 709/248 |
| 9,146,704 B1* | 9/2015 | Lin | G06F 21/62 |
| 9,274,974 B1* | 3/2016 | Chen | G06F 12/109 |
| 2002/0129264 A1* | 9/2002 | Rowland | H04L 63/102 709/224 |
| 2003/0135731 A1* | 7/2003 | Barkan | H04L 9/3234 713/155 |
| 2005/0132205 A1* | 6/2005 | Palliyil | H04L 63/123 713/188 |
| 2006/0075494 A1* | 4/2006 | Bertman | G06F 21/566 726/22 |
| 2006/0195906 A1* | 8/2006 | Jin | H04L 9/3236 726/28 |
| 2006/0230451 A1* | 10/2006 | Kramer | G06F 21/56 726/22 |
| 2007/0150948 A1* | 6/2007 | De Spiegeleer | G06F 21/57 726/22 |
| 2008/0065639 A1* | 3/2008 | Choudhary | G06F 7/02 |
| 2008/0256636 A1* | 10/2008 | Gassoway | G06F 21/565 726/24 |
| 2010/0138924 A1* | 6/2010 | Heim | G06F 21/566 726/24 |
| 2011/0167261 A1* | 7/2011 | Fanton | H04L 63/08 713/165 |
| 2012/0072982 A1* | 3/2012 | Ranganathan | G06Q 30/06 726/22 |
| 2012/0198528 A1* | 8/2012 | Baumhof | H04L 63/12 726/6 |
| 2013/0086017 A1* | 4/2013 | Chao | H04L 63/1416 707/698 |
| 2013/0086635 A1* | 4/2013 | Hershey | H04L 63/1408 726/25 |
| 2013/0145437 A1* | 6/2013 | Zaitsev | H04L 63/145 726/4 |
| 2014/0082732 A1* | 3/2014 | Britton | G06F 21/00 726/23 |
| 2014/0090081 A1* | 3/2014 | Mattsson | G06F 21/6227 726/27 |
| 2014/0164352 A1* | 6/2014 | Denninghoff | H03H 9/02622 707/711 |
| 2014/0282900 A1* | 9/2014 | Wang | H04L 63/04 726/4 |
| 2014/0289853 A1* | 9/2014 | Teddy | G06F 21/566 726/23 |
| 2015/0089647 A1* | 3/2015 | Palumbo | G06F 21/53 726/23 |
| 2016/0366159 A1* | 12/2016 | Chiba | H04L 63/1458 |

* cited by examiner

SYSTEM AND METHOD FOR MALWARE DETECTION USING HASHING TECHNIQUES

CROSS-REFERENCE TO RELATED APPLICATIONS

This application is a continuation of, and claims priority under 35 U.S.C. § 120 to, U.S. patent application Ser. No. 15/878,566, filed Jan. 24, 2018, which is a continuation of U.S. patent application Ser. No. 14/681,311, now U.S. Pat. No. 9,912,690, filed Apr. 8, 2015, which claims priority to U.S. Provisional Patent Application No. 61/976,722, filed on Apr. 8, 2014, the entire contents of each of which are fully incorporated herein by reference in their entireties.

FIELD OF DISCLOSURE

The present disclosure relates to systems and methods for identifying malware using hashing techniques in order to identify unique code found in a target web application at the time the web application is rendered by the client.

BACKGROUND OF THE DISCLOSURE

Malware, for example Trojan horse malware such as Zeus, is developed to steal information, such as login credentials for online platforms. These online platforms may include social networking platforms, e-mail platforms, and online platforms. Detecting and removing this malware is often difficult. Current solutions include using a count to detect the number of scripts running on a particular web site. However, with the introduction of dynamic websites, a count may not work as the number of scripts running on a website may vary.

These and other drawbacks exist.

SUMMARY OF THE DISCLOSURE

The example embodiments of the disclosure describe a solution to the above-identified problems that is necessarily rooted in computer technology in order to overcome problems related to malware, which arise specifically in the realm of computer networks. For example, the example embodiments relate to systems and methods that enable the identification and removal of malware in various network-based computer platforms such as social networking platforms, email platforms, and the Internet and other online platforms.

In one example embodiment, the present disclosure is directed to a method for identifying malware using hashing techniques in order to identify unique code found in the target web application at the time it is rendered by the client. The method includes generating or receiving a listing of acceptable hash values at a server side network element, generating a current hash value associated with a present website being accessed on a client side device, comparing the generated current hash value with the acceptable hash values using the sever side network element, and using the comparison for malware detection where when a current hash value is not found on the acceptable hash value listing, the server side network element indicates that it has detected malware associated with the website accessed from the client side device.

In various aspects, malware may be injected on the client side using a Trojan horse type of malware program that when executed carries out a variety of operations, including, for example, using the matching as part of a botnet, data theft, keystroke logging, watching the user's screen, viewing the user's webcam, and controlling the computer system remotely.

In various aspects, the method includes performing an activity in response to detecting malware. For example, a server side network element may transmit an alert to a second server side network element, a server side network element may transmit a message to a second server side network element indicating that an account associated with the client side device be locked or flagged, a server side network element may transmit an alert to a client side device indicating that malware was detected during a log-in or other activity using an account associated with the client side device and/or a username detected during the malware detection, and/or a sever side network element may transmit a message to a client side device indicating that server side activity has occurred (e.g., the server locked an account) in response to malware detection associated with a client side device and/or an account. In various aspects, the method includes transmitting an alert and/or a message to a reporting authority in order to report the detection of malware.

In various aspects, the method includes displaying, on a client side device, data indicative of the alert and/or message indicating server side activity and/or detection of malware.

In various aspects, the method includes wherein the server side system is associated with a financial services institution.

BRIEF DESCRIPTION OF THE DRAWINGS

Various embodiments of the present disclosure, together with further objects and advantages, may best be understood by reference to the following description taken in conjunction with the accompanying drawings, in the several figures of which like reference numerals identify like elements, and in which.

DETAILED DESCRIPTION

Figure 1:
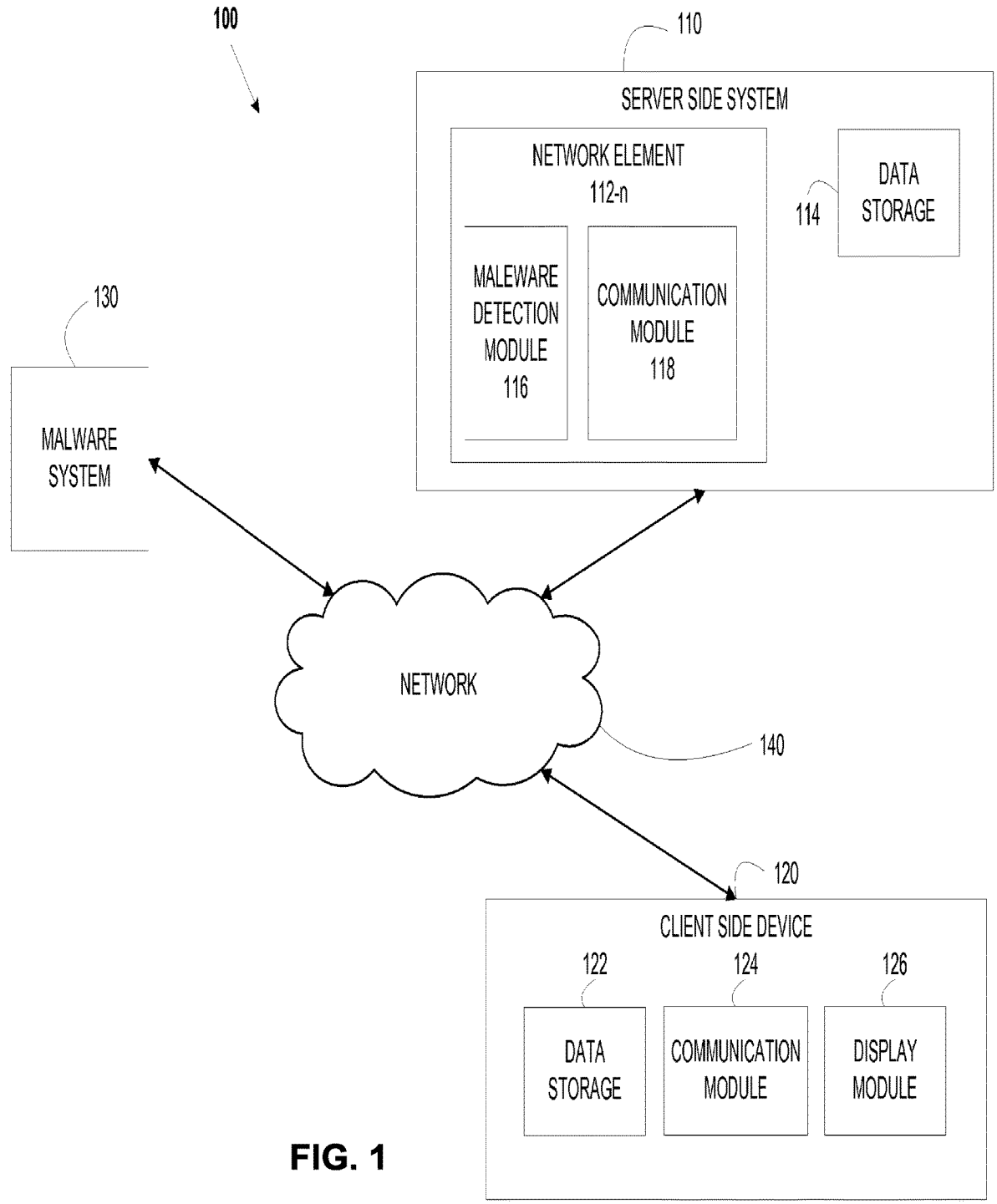
FIG. 1 is a diagram illustrating an example system for identifying malware using hashing techniques, consistent with various embodiments.

The following description is intended to convey a thorough understanding of the embodiments described by providing a number of specific example embodiments and details involving systems and methods for identifying malware using hashing techniques. It should be appreciated, however, that the present disclosure is not limited to these specific embodiments and details, which are example only. It is further understood that one possessing ordinary skill in the art, in light of known systems and methods, would appreciate the use of the invention for its intended purposes and benefits in various embodiments, depending on specific design and other needs. A financial services institution and system supporting a financial institution are used in the examples of the disclosure. However, the disclosure is not intended to be limited to financial services institutions only. Instead, the disclosed system and method can be extended to any entity that seeks to identifying malware using hashing techniques without departing from the spirit and scope of the disclosure.

According to the various embodiments of the present disclosure, systems and methods are disclosed for identifying malware using hashing techniques. The systems and methods solve a problem in computer networks—malware detection and removal. The solutions described herein are necessarily rooted in computer technology to overcome various problems relating to malware, including, for example, the HTML injection of malware into client-side web documents. The systems and methods depicted in FIGS. 1 through 3 allow a services system operating on the server side, such as a financial services system, to identify malware using hashing techniques. In an example embodiment, the systems and methods of the disclosure are configured to operate in connection with a client side device (e.g., a smartphone, an electronic reader, a laptop computer, etc. a set top box, a cable card, etc.) that allows a user to access server side content. In such an embodiment, the system may include one or more software applications stored in memory associated with the client device, and the memory may be accessed by one or more computer processors associated with the user device and the stored software applications executed by the one or more computer processors. The systems and methods may further include one or more corresponding server applications and one or more cloud-based services, which may be operated by data service providers, for example. The data service providers may provide raw data that is transmitted to and subsequently stored in the memory of the user device, and the software applications executing on the user device may dynamically access the memory, retrieve the stored data, and display the data in a format that is most visually accessible, intuitive, preferred and/or understandable by the user. In the disclosed embodiments, the illustrative data provider may be a financial services institution, but the data provider also may be any type of entity that provides data to a user via a user device.

FIG. 1 is a diagram illustrating an example system for identifying malware using hashing techniques, according to the various embodiments. As shown in FIG. 1, an example system 100 may include one or more server side systems 110, one or more client devices 120, one or more malware systems 130, and network 140. As shown in FIG. 1, one or more server side systems 110, one or more client devices 120, and one or more malware systems 130 may be connected to and/or communicatively coupled to each other via network 140.

For example, network 140 may be one or more of a wireless network, a wired network or any combination of wireless network and wired network. For example, network 140 may include one or more of a fiber optics network, a passive optical network, a cable network, an Internet network, a satellite network, a wireless LAN, a Global System for Mobile Communication ("GSM"), a Personal Communication Service ("PCS"), a Personal Area Network ("PAN"), Wireless Application Protocol (WAP), Multimedia Messaging Service (MMS), Enhanced Messaging Service (EMS), Short Message Service (SMS), Time Division Multiplexing (TDM) based systems, Code Division Multiple Access (CDMA) based systems, D-AMPS, Wi-Fi, Fixed Wireless Data, IEEE 802.11b, 802.15.1, 802.11n and 802.11g or any other wired or wireless network for transmitting and receiving a data signal.

In addition, network 140 may include, without limitation, telephone lines, fiber optics, IEEE Ethernet 902.3, a wide area network ("WAN"), a local area network ("LAN"), or a global network such as the Internet. Also network 140 may support an Internet network, a wireless communication network, a cellular network, or the like, or any combination thereof. Network 140 may further include one network, or any number of the example types of networks mentioned above, operating as a stand-alone network or in cooperation with each other. Network 140 may utilize one or more protocols of one or more network elements to which they are communicatively coupled. Network 140 may translate to or from other protocols to one or more protocols of network devices. Although network 140 is depicted as a single network, it should be appreciated that according to one or more embodiments, network 140 may comprise a plurality of interconnected networks, such as, for example, the Internet, a service provider's network, a cable television network, corporate networks, and home networks.

Server side systems 110 may be any type of entity that provides any type of data and/or services to end users via client devices 120. In the examples provided herein, server side systems 110 may include financial institutions including, by way of example and not limitation, depository institutions (e.g., banks, credit unions, building societies, trust companies, mortgage loan companies, pre-paid gift cards or credit cards, etc.), contractual institutions (e.g., insurance companies, pension funds, mutual funds, etc.), investment institutions (e.g., investment banks, underwriters, brokerage funds, etc.), and other non-bank financial institutions (e.g., pawn shops or brokers, cashier's check issuers, insurance firms, check-cashing locations, payday lending, currency exchanges, microloan organizations, crowd-funding or crowd-sourcing entities, third-party payment processors, etc.). In an example embodiment, server side systems 110 may provide access to data via network 140 to a client device 120 where a user of a client device 120 may be required to provide log-in credentials in order to access data and/or services provided by server side system 110. Log-in credentials may include a user name, e-mail address, identification number, account number, social security number, or any form of user identification. Log-in credentials may include a password, PIN number, access code, authorization code, or any form of data required to authenticate a user. Log-in credentials also a challenge-response test such as CAPTCHA, SiteKey, security question responses, and/or biometric authorization.

Server side system 110, client device 120, and malware system 130 may each include a network-enabled computer system and/or device. As referred to herein, a network-enabled computer system and/or device may include, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, or other device. The network-enabled computer systems may execute one or more software applications to, for example, receive data as input from an entity accessing the network-enabled computer system, process received data, transmit data over a network, and receive data over a network. The network-enabled computer systems may further include data storage. The data storage of the network-enabled computer systems may include electronic information, files, and documents stored in various ways, including, for example, a flat file, indexed file, hierarchical database, relational database, such as a database created and maintained with software from, for example, Oracle® Corporation, Microsoft® Excel file, Microsoft® Access file, or any other storage mechanism.

Server side system 110, client device 12, and malware system 130 may further include, for example, a processor, which may be several processors, a single processor, or a single device having multiple processors. Although depicted as single elements, it should be appreciated that according to one or more embodiments, server side system 110, client device 12, and malware system 130 may comprise a plurality of server side systems 110, client devices 12, and malware systems 130.

Server side system 110 may include one or more network elements 112-*n* (e.g., network element 112-1, network element 112-2 . . . network element 112-*n*) and data storage 114. As shown in FIG. 1, each network element 112-*n* may include various modules. As used herein, the term "module" may be understood to refer to computer executable software, firmware, hardware, or various combinations thereof. It is noted that the modules shown and described herein are intended as examples. The modules may be combined, integrated, separated, or duplicated to support various applications. Also, a function described herein as being performed at a particular module may be performed at one or more other modules and by one or more other devices instead of or in addition to the function performed at the particular module. Further, the modules may be implemented across multiple devices or other components local or remote to one another. Additionally, the modules may be moved from one device and added to another device, or may be included in both devices.

Network element 112-*n* may include, for example, a malware detection module 116 and a communication module 118. Communication module 118 may enable communication between the components of system 100. Communication module 118 may include hardware, software, and/or firmware that may enable communication between server side system 110 and client device 120 and/or other components of system 110 using network 140. For example, communications module 118 may include an input/output interface and input/output devices driven by a processor. An input/output device and/or interface may include, for example, a transceiver, modems, network interfaces, buses, CD-ROM, keyboard, mouse, microphone, camera, touch screen, printers, USB flash drives, speakers, and/or any other device configured to receive and transmit electronic data.

Malware detection module 116 may include hardware and/or software to enable the detection and reporting of malware associated with a client side request to authenticate. For example, malware detection module may include at least one processor configured to calculate a hash value associated with a web application request received from a client device. Malware detection module 116 may include at least one processor configured to generate and/or request and receive a list of acceptable hash values to compare against calculated hash values. Malware detection module 116 may include at least one processor configured to transmit an alert and/or a message associated with a comparison of acceptable hash values with a calculated hash value to a client device and/or network element associated with a server side system.

Client device 120 may be any type of electronic device and/or component configured to execute one or more processes. In the example embodiments disclosed herein, client device 120 may include, for example, one or more mobile devices, such as, for example, personal digital assistants (PDA), tablet computers and/or electronic readers (e.g., iPad, Kindle Fire, Playbook, Touchpad, etc.), telephony devices, smartphones, cameras, music playing devices (e.g., iPod, etc.), televisions, set-top-box devices, and the like. It is anticipated, however, that the disclosed systems and methods may be used, for example, in connection with other types of client devices 120, such as, for example, clients computers, desktop computers, laptop computers, network computers, workstations, personal digital assistants (PDA), tablet PCs, printers, copiers, scanners, projectors, home entertainment systems, audio/visual systems, home security devices, intercoms, appliances, and the like, or any component or sub-component of another client device 120 or assemblage, such as, for example, a car, a train, a plane, a boat, and the like. Although not illustrated, client devices 120 also may include servers and/or databases. Client devices 120 may be configured to transmit and/or receive information to and/or from other client devices 120, server side systems 110, and/or malware systems 130, either directly and/or indirectly via any combination of wired and/or wireless communication systems, method, and devices, including, for example, network 140.

Client device 120 may include at least one central processing unit (CPU), which may be configured to execute computer program instructions to perform various processes and methods. Client device 120 may include data storage 122, including for example, random access memory (RAM) and read only memory (ROM), which may be configured to access and store data and information and computer program instructions. Data storage 122 may also include storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, any type of tangible and non-transitory storage medium), where the files that comprise an operating system, application programs including, for example, web browser application, email application and/or other applications, and data files may be stored. Client device 120 may include a communication module 124, which may include for example, I/O devices, which may be configured to provide input and/or output to client device 120 (e.g., keyboard, mouse, display, speakers, printers, modems, network cards, etc.). Communication module also may include antennas, network interfaces that may provide or enable wireless and/or wire line digital and/or analog interface to one or more networks, such as network 140, over one or more network connections, a power source that provides an appropriate alternating current (AC) or direct current (DC) to power one or more components of client device 120, and a bus that allows communication among the various components of client device 120. Client device 120 may include a display module 126, which may include for example output devices, such as a printer, display screen (e.g., monitor, television, and the like), speakers, projector, and the like. Although not shown, each client device 120 may include one or more encoders and/or decoders, one or more interleavers, one or more circular buffers, one or more multiplexers and/or de-multiplexers, one or more permuters and/or depermuters, one or more encryption and/or decryption units, one or more modulation and/or demodulation units, one or more arithmetic logic units and/or their constituent parts, and the like. These mechanisms and/or devices may include any combination of hardware and/or software components and may be included, in whole or in part, in any of the components shown in FIG. 2.

Figure 2:
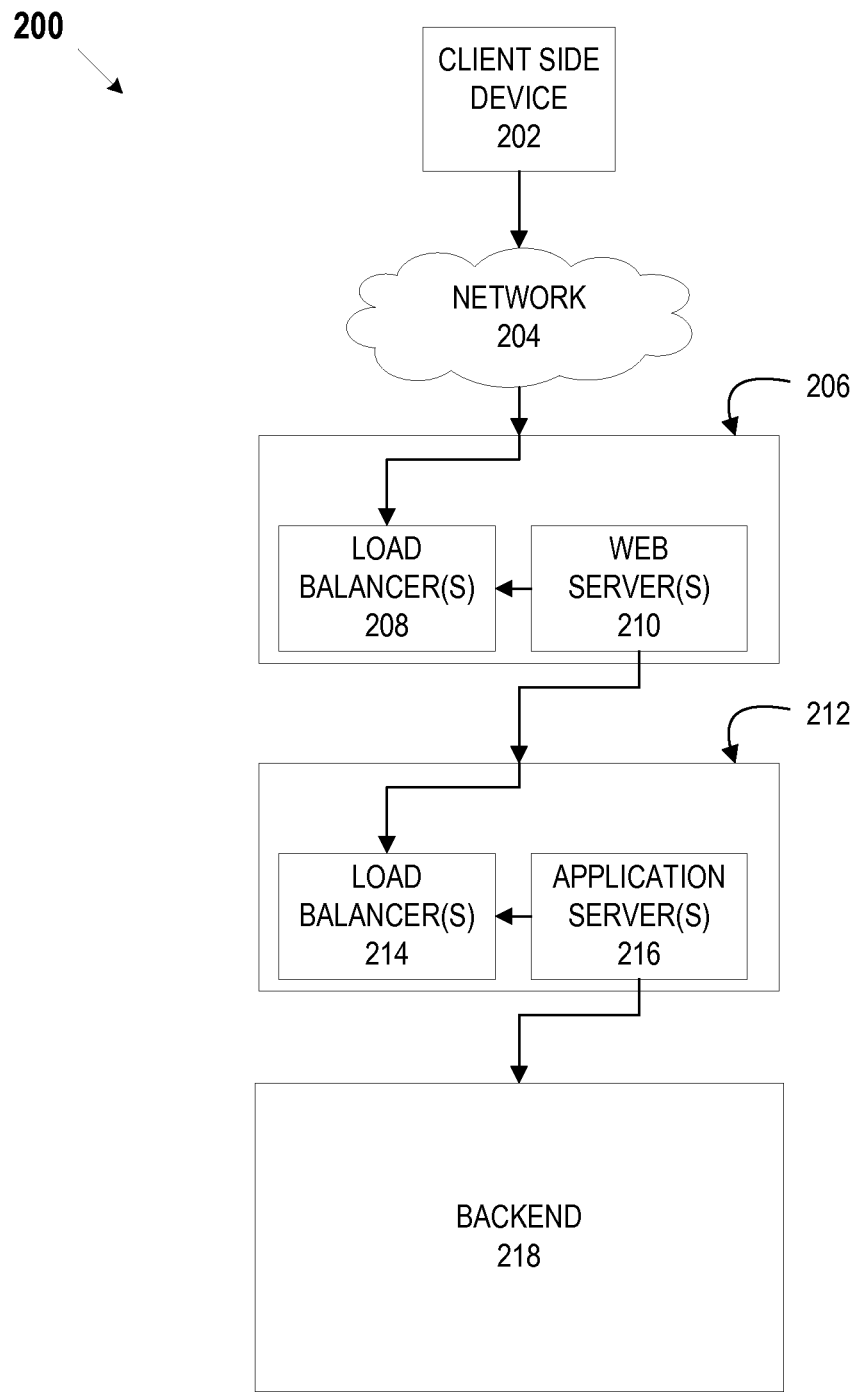
FIG. 2 is a diagram illustrating an example system for identifying malware using hashing techniques, consistent with various embodiments.

In one or more designs of client device 120 of FIG. 2, the functions described may be implemented in hardware, software, firmware, or any combination thereof. If implemented in software, the functions may be stored as one or more instructions or code on computer-readable medium, including the computer-readable medium described above (e.g., RAM, ROM, storage media, and the like.).

Although FIG. 1 depicts server side system 110 and client device 120 communicating with one another using an indirect network connection, such as a connection through network 140, those skilled in the art may appreciate that server side system 110 and client device 120 may communicate with one another and similar devices using a direct communications link or a communications link separate from network 140. For example, server side system 110 and client device 120 may communicate with one another via point-to-point connections (e.g., Bluetooth connections, etc.), peer-to-peer connections, and the like. By way of example, server side system 110 and client device 120 may communicate with one another via mobile contactless communication and/data transfers, remote electronic communication and/or data transfers, magnetic stripe communication and/or data transfers, secure chip technology communication and/or data transfers, person-to-person communication and/or data transfers, and the like. Additionally, server side system 110 and client device 120 may communicate with one another utilizing standardized transmission protocols, for example and not by way of limitation, ISO/IEC 14443 A/B, ISO/IEC 18092, MiFare, FeliCa, tag/smartcard emulation, and the like. Also server side system 110 and client device 120 may communicate with one another utilizing transmission protocols and methods that are developed in the future using other frequencies or modes of transmission. Server side system 110 and client device 120 may communicate with one another via existing communication and/data transfer techniques, such as, for example RFID. Also, server side system 110 and client device 120 may communicate with one another via new and evolving communication and/data transfer standards including internet-based transmission triggered by near-field communications (NFC).

In the embodiment of FIG. 1, server side systems 110, client devices 120, and malware systems 130 may communicate using standard Internet Protocols, such as HTTP, transmission control protocol (TCP), internet protocol (IP), etc. For example, HTTP requests from client devices 120 may be encapsulated in TCP segments, IP datagrams, and Ethernet frames and transmitted to server side systems 110. Third parties, for example, may participate as intermediaries in the communication, such as, for example, Internet Service Providers (ISPs) or other entities that provide routers and link layer switches. Such third parties may not, however, analyze or review the contents of the Ethernet frames beyond the link layer and the network layer, but instead analyze only those parts of the packet necessary to route communications among and between from client devices 120 and server side systems 110.

However, malware system 130 may insert markup language and/or scripts, such as, for example, HTML, into a web application associated with server side system 110 that is accessed using client device 120. Accordingly, malware module 116 at server side system 110 may detect any inserted markup language and/or scripts inserted by a malware system. For example, malware module 116 may interact with other components of server system 110 to detect malware using, for example, methods illustrated in FIG. 3.

FIG. 2 depicts an example system 200 that may enable various entities including a web-based entity, a financial institution, or the like, for example, to provide network services to its customers. As shown in FIG. 2, system 200 may include a client device 202, a network 204, a front-end controlled domain 206, a back-end controlled domain 212, and a backend 218. Frontend controlled domain 206 may include one or more load balancers 208 and one or more web servers 210. Back-end controlled domain 212 may include one or more load balancers 214 and one or more application servers 216.

Client device 202 may be a network-enabled computer: As referred to herein, a network-enabled computer may include, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, or other device. The one or more network-enabled computers of the example system 200 may execute one or more software applications to enable, for example, network communications. In various example embodiments, client device 202 may be similar to client side device 120.

Client device 202 also may be a mobile device: For example, a mobile device may include an iPhone, iPod, iPad from Apple® or any other mobile device running Apple's iOS operating system, any device running Google's Android® operating system, including for example, Google's wearable device, Google Glass, any device running Microsoft's Windows® Mobile operating system, and/or any other smartphone or like wearable mobile device.

Network 204 may be one or more of a wireless network, a wired network, or any combination of a wireless network and a wired network. For example, network 204 may include one or more of a fiber optics network, a passive optical network, a cable network, an Internet network, a satellite network, a wireless LAN, a Global System for Mobile Communication (GSM), a Personal Communication Service (PCS), a Personal Area Networks, (PAN), D-AMPS, Wi-Fi, Fixed Wireless Data, IEEE 802.11b, 802.15.1, 802.11n, and 802.11g or any other wired or wireless network for transmitting and receiving a data signal.

In addition, network 204 may include, without limitation, telephone lines, fiber optics, IEEE Ethernet 902.3, a wide area network (WAN), a local area network (LAN) or a global network such as the Internet. Also, network 204 may support an Internet network, a wireless communication network, a cellular network, or the like, or any combination thereof. Network 204 may further include one network, or any number of example types of networks mentioned above, operating as a stand-alone network or in cooperation with each other. Network 204 may utilize one or more protocols of one or more network elements to which they are communicatively couples. Network 204 may translate to or from other protocols to one or more protocols of network devices. Although network 204 is depicted as a single network, it should be appreciated that according to one or more embodiments, network 204 may comprise a plurality of interconnected networks, such as, for example, the Internet, a service provider's network, a cable television network, corporate networks, and home networks. In various example embodiments, network 204 may be similar to network 140.

Front-end controlled domain 206 may be implemented to provide security for backend 218. Load balancer(s) 208 may distribute workloads across multiple computing resources, such as, for example computers, a computer cluster, network links, central processing units or disk drives. In various embodiments, load balancer(s) 210 may distribute workloads across, for example, web server(S) 216 and/or backend 218 systems. Load balancing aims to optimize resource use, maximize throughput, minimize response time, and avoid overload of any one of the resources. Using multiple components with load balancing instead of a single component may increase reliability through redundancy. Load balancing is usually provided by dedicated software or hardware, such as a multilayer switch or a Domain Name System (DNS) server process.

Load balancer(s) 208 may include software that monitoring the port where external clients, such as, for example, client device 202, connect to access various services of a financial institution, for example. Load balancer(s) 208 may forward requests to one of the application servers 216 and/or backend 218 servers, which may then reply to load balancer 208. This may allow load balancer(s) 208 to reply to client device 202 without client device 202 ever knowing about the internal separation of functions. It also may prevent client devices from contacting backend servers directly, which may have security benefits by hiding the structure of the internal network and preventing attacks on backend 218 or unrelated services running on other ports, for example.

A variety of scheduling algorithms may be used by load balancer(s) 208 to determine which backend server to send a request to. Simple algorithms may include, for example, random choice or round robin. Load balancers 208 also may account for additional factors, such as a server's reported load, recent response times, up/down status (determined by a monitoring poll of some kind), number of active connections, geographic location, capabilities, or how much traffic it has recently been assigned.

Load balancers 208 may be implemented in hardware and/or software. Load balancer(s) 208 may implement numerous features, including, without limitation: asymmetric loading; Priority activation: SSL Offload and Acceleration; Distributed Denial of Service (DDoS) attack protection; HTTP compression; TCP offloading; TCP buffering; direct server return; health checking; HTTP caching; content filtering; HTTP security; priority queuing; rate shaping; content-aware switching; client authentication; programmatic traffic manipulation; firewall; intrusion prevention systems.

Web server(s) 210 may include hardware (e.g., one or more computers) and/or software (e.g., one or more applications) that deliver web content that can be accessed by, for example a client device (e.g., client device 202) through a network (e.g., network 204), such as the Internet. In various examples, web servers, may deliver web pages, relating to, for example, online banking applications and the like, to clients (e.g., client device 202). Web server(s) 210 may use, for example, a hypertext transfer protocol (HTTP or sHTTP) to communicate with client device 202. The web pages delivered to client device may include, for example, HTML documents, which may include images, style sheets and scripts in addition to text content.

A user agent, such as, for example, a web browser, web crawler, or native mobile application, may initiate communication by making a request for a specific resource using HTTP and web server 210 may respond with the content of that resource or an error message if unable to do so. The resource may be, for example a file on stored on backend 218. Web server(s) 210 also may enable or facilitate receiving content from client device 202 so client device 202 may be able to, for example, submit web forms, including uploading of files.

Web server(s) also may support server-side scripting using, for example, Active Server Pages (ASP), PHP, or other scripting languages. Accordingly, the behavior of web server(s) 210 can be scripted in separate files, while the actual server software remains unchanged.

Load balancers 214 may be similar to load balancers 208 as described above.

Application server(s) 216 may include hardware and/or software that is dedicated to the efficient execution of procedures (e.g., programs, routines, scripts) for supporting its applied applications. Application server(s) 216 may comprise one or more application server frameworks, including, for example, Java application servers (e.g., Java platform, Enterprise Edition (Java EE), the .NET framework from Microsoft®, PHP application servers, and the like). The various application server frameworks may contain a comprehensive service layer model. Also, application server(s) 216 may act as a set of components accessible to, for example, a financial institution or other entity implementing system 200, through an API defined by the platform itself. For Web applications, these components may be performed in, for example, the same running environment as web server(s) 210, and application servers 216 may support the construction of dynamic pages. Application server(s) 216 also may implement services, such as, for example, clustering, fail-over, and load-balancing. In various embodiments, where application server(s) 216 are Java application servers, the web server(s) 216 may behaves like an extended virtual machine for running applications, transparently handling connections to databases associated with backend A on one side, and, connections to the Web client (e.g., client device 202) on the other.

Backend 218 may include hardware and/or software that enables the backend services of, for example, a financial institution or other entity that maintains a distributed system similar to system 200. For example, backend 218 may include, a system of record, online banking applications, a rewards platform, a payments platform, a lending platform, including the various services associated with, for example, auto and home lending platforms, a statement processing platform, one or more platforms that provide mobile services, one or more platforms that provide online services, a card provisioning platform, a general ledger system, and the like. Backend 218 may be associated with various databases, including account databases that maintain, for example, customer account information, product databases that maintain information about products and services available to customers, content databases that store content associated with, for example, a financial institution, and the like. Backend 218 also may be associated with one or more servers that enable the various services provided by system 200. In various example embodiments, front-end controlled domain 206, back-end controlled domain 212 and backend 218 may be components within, for example, a server side system (e.g., server side system 110 as shown and described in FIG. 1).

Figure 3:
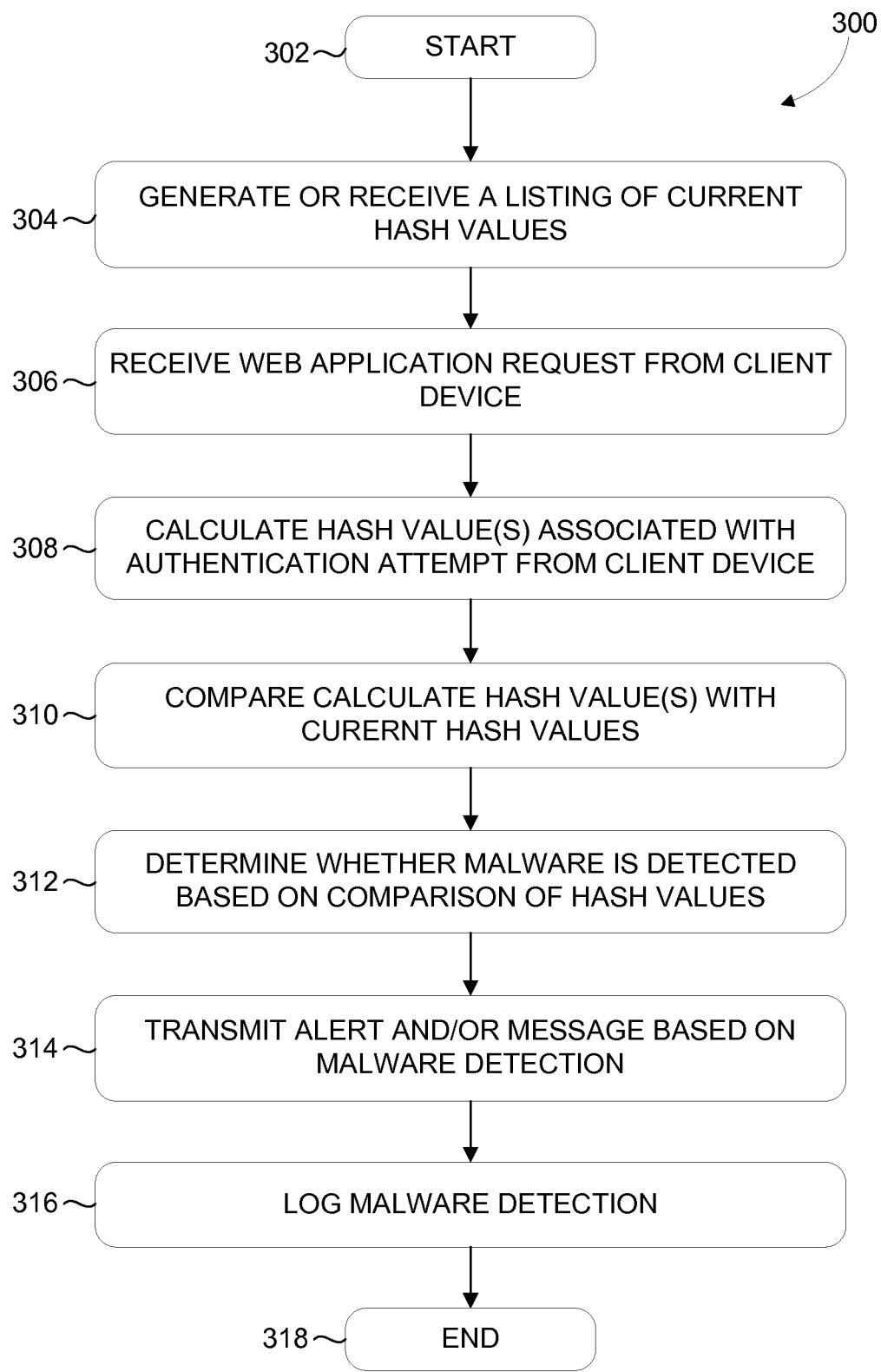
FIG. 3 is a flowchart illustrating an example method system for identifying malware using hashing techniques, consistent with various embodiments.

FIG. 3 is an example flowchart 300 for identifying malware using hashing techniques. Specifically, FIG. 3 illustrates an example embodiment in which a server side system, such as server side system 110, identifies malware from a malware system, such as malware system 130, using a hashing technique that identifies unique code found in a target web application at the time the web application is rendered by a client device, such as client device 120.

The method may begin at block 302. At block 304, a server side system may generate and/or receive a listing of currently acceptable hash values. For example, a server side system may receive a pre-generated list of acceptable hash values from a third party source. A server side system may also calculate hash values for acceptable scripts and/or code that may be used in a server side web application. Accordingly, once acceptable hash values are calculated, the acceptable hash values may be stored in a listing of acceptable hash values in data storage associated with a server side system.

The calculation of hash values may include using any hash function that returns a hash value, such as a trivial hash function, a perfect hash function, special-purpose hash functions, rolling hash function, and the like.

At block 306, a server side system may receive a web application request from a client device. The web application request may be from a target web application associated with the server side system that is being accessed on a client device. The web application request may be a request to authenticate in order to log into a client account maintained by the server side system, a request for a specific web application, or a request to access any data maintained by the server side system.

At block 308, a server side system may calculate at least one hash value associated with the request received from the client device. A server side system may calculate a plurality of hash values associated with the request received from the client device. For example, where multiple scripts are run on a web page, a hash value may be calculated for each script run on the web page. The calculation of hash values may include using any hash function that returns a hash value, such as a trivial hash function, a perfect hash function, special-purpose hash functions, rolling hash function, and the like. The hash value may be calculated using the same hash function that produced the hash values included in the accepted list of hash valued generated by and/or received at the server side system.

Once all hash values for the target web page requested by a client device, the server side system may compare the calculate hash values associated with the target web page requested by a client device with the hash values included in the list of acceptable hash values (block 310). At block 312, the server side system may determine whether the calculated target web page hash values are included in the list of acceptable hash values. If a calculated hash value associated with a target web page is not found on the list of acceptable hash values, a server side system may determine that the target web page includes a malware script. A malware script may be inserted by a malware system, for example, in order to disrupt client device and/or server side system operation, gather sensitive information, or gain access to client and/or server side systems.

At block 314, a server side system may transmit an alert and/or a message to a server side system element and/or a client device. By way of example, an alert may include data associated with the detected malware. Data associated with detected malware may include for example, a date and/or timestamp, a target web page address, user identification information associated with the client device attempting to access the target web page, and/or malware identification data including, for example, a hash value and/or script information associated with the hash value. An alert sent to a server side network element may include a request to lock the account associated with user identification information, such as a username, client device identification information, account number, account identifier, and the like. A message may include a message sent to a client device associated with the malware detection and may include notification that malware has been detected, a notification that an account associated with the target web page request has been locked, and/or a notification to contact customer support. A message may include a message sent to a server side system network element and may include notification that malware has been detected, a notification that an account associated with the target web page request has been locked, and/or a notification that a message to a client device has been delivered.

At block 316, a server side system may log any malware detection. A log for malware detection may be stored within the server side system and may include, for example, date and/or time of malware detection, client device identification associated with malware detection, calculated hash value(s) associated with malware detection, HTML or other scripts associated with malware detection, and/or alerts and/or messages sent in response to malware detection. The method may end at block 318.

It is further noted that the systems and methods described herein may be tangibly embodied in one of more physical media, such as, but not limited to, a compact disc (CD), a digital versatile disc (DVD), a floppy disk, a hard drive, read only memory (ROM), random access memory (RAM), as well as other physical media capable of storing software, or combinations thereof. Moreover, the figures illustrate various components (e.g., servers, computers, processors, etc.) separately. The functions described as being performed at various components may be performed at other components, and the various components bay be combined or separated. Other modifications also may be made.

The present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It may be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It may be further understood by those within the art that if a specific number of an introduced claim recitation is intended, such an intent may be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It may be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" may be understood to include the possibilities of "A" or "B" or "A and B."

The foregoing description, along with its associated embodiments, has been presented for purposes of illustration only. It is not exhaustive and does not limit the invention to the precise form disclosed. Those skilled in the art may appreciate from the foregoing description that modifications and variations are possible in light of the above teachings or may be acquired from practicing the disclosed embodiments. For example, the steps described need not be performed in the same sequence discussed or with the same degree of separation. Likewise various steps may be omitted, repeated, or combined, as necessary, to achieve the same or similar objectives. Accordingly, the invention is not limited to the above-described embodiments, but instead is defined by the appended claims in light of their full scope of equivalents.

In the preceding specification, various preferred embodiments have been described with references to the accompanying drawings. It may, however, be evident that various modifications and changes may be made thereto, and additional embodiments may be implemented, without departing from the broader scope of the invention as set forth in the claims that follow. The specification and drawings are accordingly to be regarded as an illustrative rather than restrictive sense.

What is claimed is:

1. A system, comprising:
   a backend server that includes a backend processor configured to calculate a hash value for a known web application;
   backend data storage configured to store the known web application and the calculated hash value for the known web application;
   a backend communication interface configured to:
      receive, via a network, a request for the known web application from a mobile device,
      provide, via the network, the known web application to the mobile device, and
      receive, via the network, at least one mobile hash value that has been calculated by the mobile device;
   a hash processor configured to:
      compare the calculated hash value to the at least one received mobile hash value to determine if the calculated hash value matches the at least one received mobile hash value, and
      identify malware when the hash processor determines that the calculated hash value does not match the at least one received mobile hash value.

2. The system of claim 1, wherein the backend processor and the mobile device are configured to calculate the hash value for the known web application and mobile hash value, respectively, using at least one of a trivial hash function, a perfect hash function, a special-purpose hash function, and a rolling hash function.

3. The system of claim 1, wherein the request for the known web application from the mobile device includes a request to authenticate the mobile device in order to log into an account maintained by the backend server.

4. The system of claim 1, wherein the backend data storage is configured to store the known web application and the calculated hash value for the known web application for comparison to more than one received mobile hash value.

5. The system of claim 1, wherein:
   the known web application includes a plurality of scripts, and the backend communication interface receives, via the network, at least one mobile hash value, that has been calculated by the mobile device, for each of the plurality of scripts, and
   the backend communication interface is configured to transmit an alert to the mobile device via the network when the hash processor determines that the calculated hash value for the known web application and the received mobile hash value do not match.

6. The system of claim 1, wherein the backend processor is configured to generate a log of the identified malware that is stored within the backend data storage, and
   wherein the log comprises date and time that the malware was identified, a mobile device identifier associated with the identified malware, and the at least one received mobile hash value associated with the identified malware.

7. The system of claim 1, wherein the hash processor is configured to not identify malware when the hash processor determines that the calculated hash value for the known web application and the received mobile hash value match.

8. The system of claim 1, wherein the backend server is configured to enable receiving content from the mobile device.

9. A system, comprising:
   a hardware request communication interface of a mobile device configured to request a web application from a backend server via a network and receive the web application from the backend server; and
   a hardware mobile device hash processor configured to calculate a mobile hash value of the received web application, wherein
   the backend server includes:
      backend data storage configured to store the web application and a hash value for the web application,
      a backend communication interface configured to receive the request, provide the web application to the mobile device, and receive at least one mobile hash value that has been calculated by the mobile device,
      a backend hash processor configured to:

compare the stored hash value for the web application with the at least one mobile hash value that has been calculated by the mobile device, determine if the stored hash value for the web application is the same as the at least one mobile hash value that has been calculated by the mobile device, and identify malware when the hash processor determines that the stored hash value for the web application is not the same as the at least one mobile hash value.

10. The system of claim 9, wherein the mobile device is configured to calculate the mobile hash value using at least one of a trivial hash function, a perfect hash function, a special-purpose hash function, and a rolling hash function.

11. The system of claim 9, wherein the request for web application from the mobile device includes a request to authenticate the mobile device in order to log into an account maintained by the backend server.

12. The system of claim 9, wherein the backend data storage is configured to store the known web application and the calculated hash value for the known web application for comparison to more than one received mobile hash value.

13. The system of claim 9, wherein:
the web application includes a plurality of scripts, and the backend communication interface receives, via the network, at least one mobile hash value, that has been calculated by the mobile device, for each of the plurality of scripts, and
the backend communication interface is configured to transmit an alert to the mobile device via the network when the backend hash processor determines that the calculated hash value for the web application and the received mobile hash value do not match.

14. The system of claim 9, wherein the backend server is configured to generate a log of the identified malware that is stored within the backend data storage, and
wherein the log comprises date and time that the malware was identified, a mobile device identifier associated with the identified malware, and the at least one mobile hash value associated with the identified malware.

15. A method, comprising:
accessing, using at least one backend processor, an accepted hash value for a script associated with a known web application;
storing the known web application and hash value for the script in backend data storage;
receiving, via a network at a backend communication interface, a request for the known web application from a mobile device;
providing, via the network and backend communication interface, the known web application to the mobile device;
receiving, via a network at the backend communication interface, at least one mobile hash value that has been calculated by the mobile device;
comparing, using a hash processor, the accepted hash value with the at least one received mobile hash values in order to determine if the accepted hash value for the script is the same as the at least one received mobile hash value;
identifying malware when the hash processor determines that the accepted hash value for the script is not the same as the at least one received mobile hash value.

16. The method of claim 15, further comprising calculating, using the backend processor and the mobile device, the hash value for the known web application and mobile hash value, respectively, using at least one of a trivial hash function, a perfect hash function, a special-purpose hash function, and a rolling hash function.

17. The method of claim 15, wherein the request for the known web application from the mobile device includes a request to authenticate the mobile device in order to log into an account maintained by the backend server.

18. The method of claim 15, wherein:
the known web application includes a plurality of scripts, and further comprising receiving, via the network, at the backend communication interface, at least one mobile hash value, that has been calculated by the mobile device, for each of the plurality of scripts, and
the backend data storage is configured to store the known web application and hash value for the script for comparison to more than one received mobile hash value.

19. The method of claim 15, further comprising transmitting, via the network and backend communication interface, an alert to the mobile device when the hash processor determines that the calculated hash value for the known web application and the received mobile hash value do not match.

20. The method of claim 15, further comprising:
generating, via the backend server, a log of the identified malware; and
storing the generated log within the backend data storage, wherein the log comprises date and time that the malware was identified, mobile device identification associated with the identified malware, and the at least one mobile hash value associated with the identified malware.

* * * * *